Nov. 26, 1940.   J. KERSTEN   2,223,213
STREET ICE REMOVER
Filed June 8, 1940   2 Sheets-Sheet 2

INVENTOR
John Kersten
BY
ATTORNEY

Patented Nov. 26, 1940

2,223,213

UNITED STATES PATENT OFFICE 2,223,213

STREET ICE REMOVER

John Kersten, Bronx, N. Y.

Application June 8, 1940, Serial No. 339,552

12 Claims. (Cl. 262—19)

This invention relates to new and useful improvements in a street ice remover.

The invention has for an object the construction of a device as mentioned which is characterized by a drum provided with teeth of a certain shape and adapted to be driven over ice on the roads for the purpose of smoothing out an otherwise extremely rough roadway and removing said roughage up to within about one inch, more or less, of the true road level by one or several times passing over it, depending on the thickness of the ice.

It is contemplated that the drum be large and heavy enough and be rotated at a suitable speed and be installed on a proper vehicle front, center, or back to cut clean through an icy, bumpy, frozen street or roadway to make same passable for traffic.

Furthermore, the invention contemplates an arrangement whereby the drum may be adjustably supported a predetermined distance above the true level of the roadway, varying from about one-half inch to several inches, as selected, and it is proposed that the supporting means be so arranged that the drum is at all times free to move upwards in the event that a projecting hard object is encountered on the road.

Still further the invention contemplates the association of a plow with the front of a vehicle provided with the street ice remover, to assist in removing snow and ice.

Another object of the invention resides in the provision of a rear shield extended along the length of the drum to catch flying chunks of ice which may be thrown by the rotative drum.

Still further the invention contemplates to characterize the drum by the fact that it is formed with a plurality of dove-tailed grooves extending longitudinally on its periphery, and by the fact that a plurality of blocks are mounted in these grooves and have projecting teeth as before specified.

Still further the invention proposes a novel arrangement by which the teeth on striking the ice on the road move slightly laterally to further assist in breaking the ice.

For further comprehension of the invention, and of the objects and advantages thereof, reference will be had to the following description and accompanying drawings, and to the appended claims in which the various novel features of the invention are more particularly set forth.

Fig. 3 is a fragmentary horizontal sectional view taken on the line 3—3 of Fig. 2.

Fig. 4 is a fragmentary vertical sectional view taken on the line 4—4 of Fig. 3.

Fig. 5 is a perspective view of one of the blocks with the teeth used in the device.

Fig. 7 is a fragmentary enlarged detailed view of a portion of the drum shown in Fig. 1.

Figure 1:
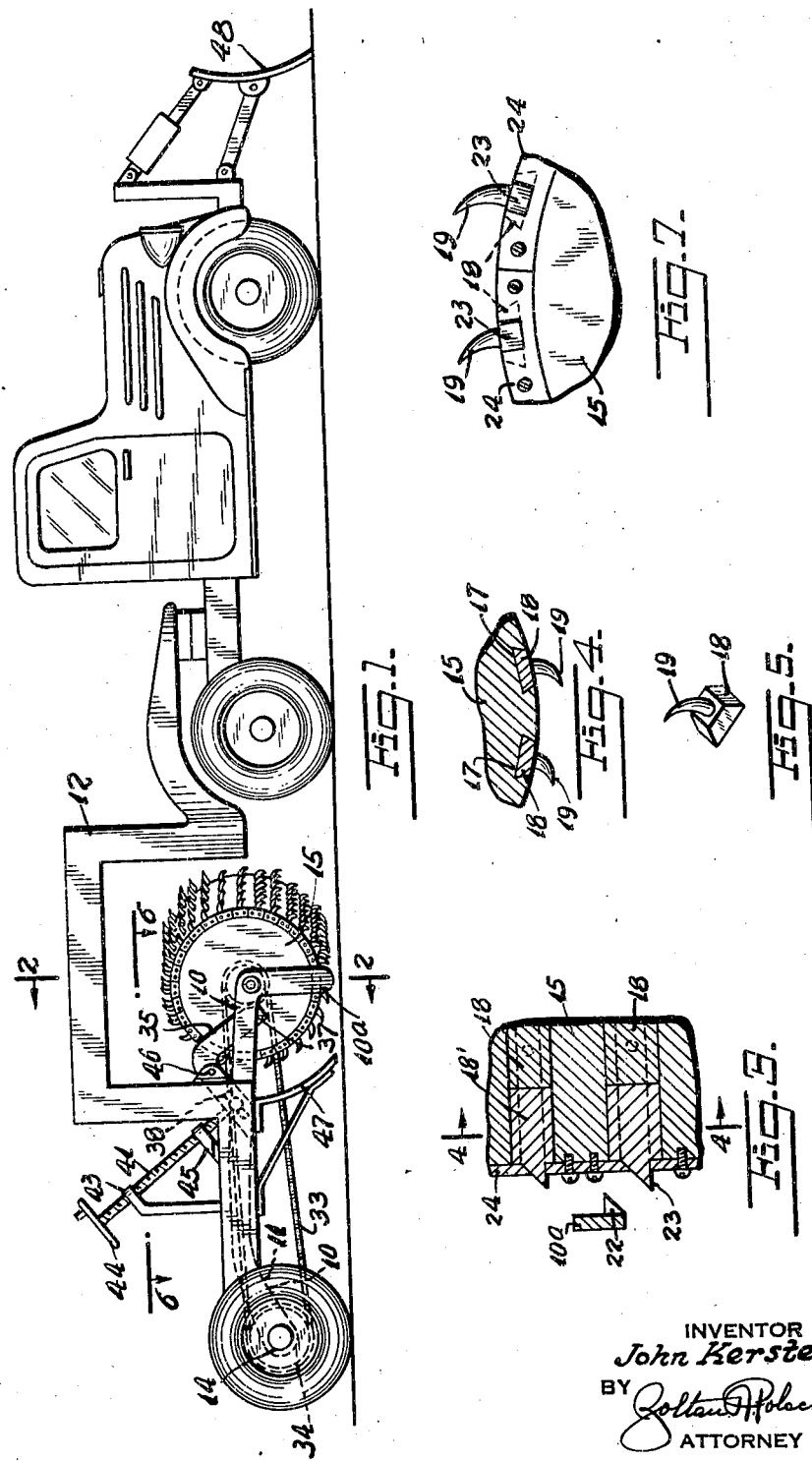
Fig. 1 is a fragmentary side elevational view of a vehicle equipped with an ice remover constructed in accordance with this invention.
Figure 2:
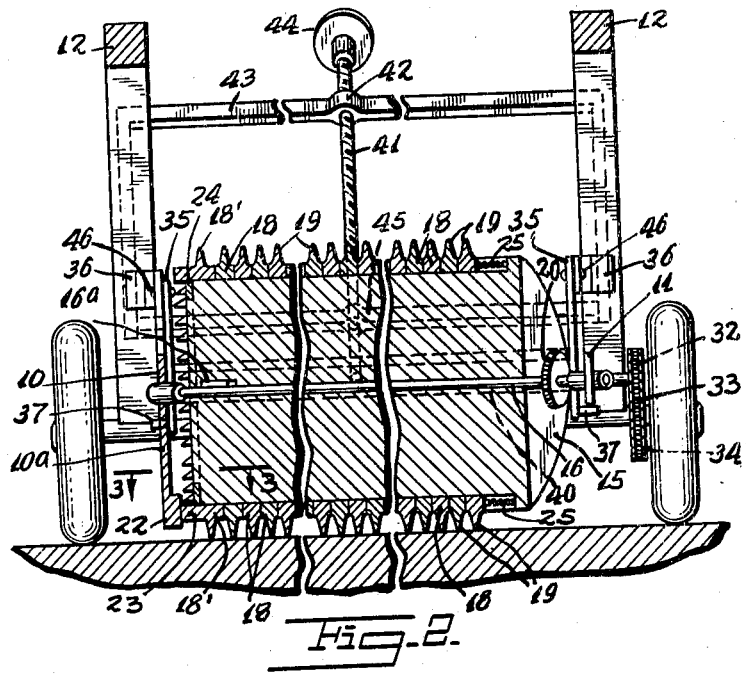
Fig. 2 is an enlarged sectional view taken on the line 2—2 of Fig. 1.
Figure 6:
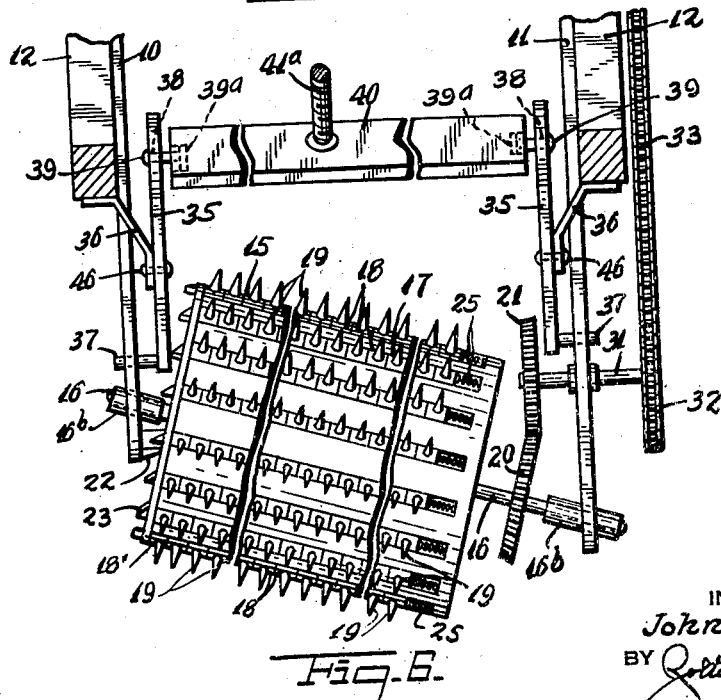
Fig. 6 is a fragmentary horizontal sectional view taken on the line 6—6 of Fig. 1.

The ice remover, in accordance with this invention, includes a pair of spaced arms 10 and 11 for pivotal attachment on a vehicle in a manner so as to freely depend. More specifically, these arms are pivotally supported on a vehicle 12 by a pintle shaft 14 which engages through the rear ends of the arms for pivotally supporting the latter. A drum 15 is rotatively mounted between the arms 10 and 11. This is accomplished by a shaft 16 passing through and keyed to the drum and mounted upon the said arms. The drum 15 is arranged at a slight inclination so that its left end is slightly forward. The purpose of this arrangement is that as the vehicle travels there will be a tendency for the ice to be pushed towards the right, off the road.

The drum 15 is provided with a plurality of longitudinally extending dovetailed grooves 17 arranged about the periphery of the drum, preferably at equally spaced positions. Each groove 17 is filled with blocks 18. These blocks are slidably mounted in the grooves. Each block 18 has one or more teeth 19 extending outwards therefrom. These teeth preferably are curved as illustrated in Figs. 1 and 5. The teeth 19 are adapted to engage and strike the ice for breaking the same. The curvature is such as to prevent injury to the road construction.

The drum 15 and shaft 16 are connected together with a key 16$^a$. The ends of the shaft 16 are rotatively supported in bearings 16$^b$ which are mounted upon the arms 10 and 11. A means is provided for rotating the drum 15. This means includes a gear 20 fixedly mounted on the shaft 16 and meshing with a gear 21 mounted on a shaft 31 rotatively supported on the arm 11. The shaft 31 supports a sprocket wheel 32 which is engaged by a chain 33. This chain extends rearwards and engages over a driver sprocket wheel 34 coaxially mounted on one of the rear wheels.

The arms 10 and 11 are pivotally supported at their rear ends by the pintle shaft 14 coaxial with the sprocket 34. Hence in all elevated and lowered positions of the front ends of the arms 10 and 11, the chain 33 will maintain a properly taut position.

A raising apparatus is provided for supporting the drum 15 in various elevated positions. This raising apparatus includes a pair of arms 35 pivotally supported intermediate of their ends on brackets 36 mounted upon portions of the frame of the vehicle 12. The front ends of the arms 35 have projecting pins 37 which engage beneath bottom edge portions of the arms 10 and 11. The rear ends of the arms 35 are provided with slots 38. Pins 39 slidably engage in these slots. These pins 39 are turnably mounted upon the ends of a bar 40 extended between the arms 35. Each pin 39 has an inner cylindrical head 39a by which the rotative connection is accomplished.

A screw 41 is threadedly engaged through a socket 42 on a bar 43 mounted across the frame of the vehicle 12. A handle 44 is mounted on the outer end of the screw 41. The screw 41 is guided through a bottom bar 45 mounted across the frame of the vehicle 12. The bottom end 41a of the screw 41 rotatively connects with the bar 40. The arrangement is such that when the screw 41 is turned in one direction it moves downwards, forcing the bar 40 downwards and pivoting the arms 35 so that their front ends move upwards.

The pins 37 lift the arms 10 and 11 and so indirectly lift the drum 15. It should be noted that at all times the drum 15 is free to move upwards since the arms 10 and 11 are merely resting on the pins 37. The weight of the drum maintains the arms 10 and 11 on the pins 37. When the screw 41 is turned in the other direction, the front ends of the arms 35 will be moved downwards, and so the drum 15 will be lowered. The arms 35 are pivotally supported on the brackets 36 by pintles 46.

A rear shield 47 is mounted across the vehicle 12 directly behind the drum 15 and is adapted to catch flying chunks of ice or other objects which may be thrown up by the revolving drum 15. A snow plow 48 is mounted on the front of the vehicle 12. This plow 48 may be used to push loose chunks of ice to one side of the road.

The operation of the device is as follows:

The handle 44 is adjusted so that the drum 15 is slightly spaced from the true surface of the roadway. The distance may depend on the condition and construction of the roadway. It may vary anywheres from one-half inch to several inches, but this is not intended as a limitation as other distances may be more desirable. The vehicle 12 is driven slowly over the road, and the drum 15 is rotated at a rapid rate. The projecting teeth 19 will strike and break up the ice and the drum 15 will move broken pieces of ice to the side of the road. The plow 48 may be used to push the loose ice to the side of the roadway. Should any of the teeth 19 strike a hard object, such as a stone, the drum 15 is free to lift upwards so that the device may pass without damage.

A means is provided for momentarily shifting the blocks 18 laterally in their extreme bottom positions. This means includes a downward extension 10a from the arm 10. A cam 22 is arranged upon the bottom of the extension 10a and is cooperative with complementary cams 23 upon the end blocks 18' of each row of blocks 18. These end blocks 18' are held from falling out by plates 24 which are permanently attached on the adjacent end of the drum 15. These plates have openings through which the cams 23 extend. The blocks 18 are pushed in the direction of the cam 22 by springs 25. These springs are contained in the remote ends of the grooves 17.

As the drum 15 rotates the row of blocks 18 at the lowermost position will be moved laterally by its cam 23 striking the stationary cam 22. After the cam 23 passes the cam 22 the spring 25 of the specific row of blocks 18 will move the blocks 18 back to their original position. The teeth 19 therefore have a double action—to dig into the ice and move laterally to break up the ice formation.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A street ice remover, comprising a pair of spaced arms for pivotal attachment on a vehicle to freely depend, a drum rotatively mounted between said arms and having its axis inclined with the left end slightly forwards, a plurality of longitudinal dovetailed grooves on the periphery of said drum, blocks slidably mounted in said grooves and having projecting teeth for striking ice on the road to break same up, means for rotating said drum, and means for shifting said blocks laterally in their extreme bottom positions.

2. A street ice remover, comprising a pair of spaced arms for pivotal attachment on a vehicle to freely depend, a drum rotatively mounted between said arms and having its axis inclined with the left end slightly forwards, a plurality of longitudinal dovetailed grooves on the periphery of said drum, blocks slidably mounted in said grooves and having projecting teeth for striking ice on the road to break same up, means for rotating said drum, and means for shifting said blocks laterally in their extreme bottom positions, said vehicle being provided with lugs, and said arms being pivotally connected at their rear ends with said lugs.

3. A street ice remover, comprising a pair of spaced arms for pivotal attachment on a vehicle to freely depend, a drum rotatively mounted between said arms and having its axis inclined with the left end slightly forwards, a plurality of longitudinal dovetailed grooves on the periphery of said drum, blocks slidably mounted in said grooves and having projecting teeth for striking ice on the road to break same up, means for rotating said drum, and means for shifting said blocks laterally in their extreme bottom positions, said drum being provided with a shaft engaging through said arms to accomplish the rotative mounting.

4. A street ice remover, comprising a pair of spaced arms for pivotal attachment on a vehicle to freely depend, a drum rotatively mounted between said arms and having its axis inclined with the left end slightly forwards, a plurality of longitudinal dovetailed grooves on the periphery of said drum, blocks slidably mounted in said grooves and having projecting teeth for striking ice on the road to break same up, means for rotating said drum, and means for shifting said blocks laterally in their extreme bottom positions, said projecting teeth being curved rearwards.

5. A street ice remover, comprising a pair of spaced arms for pivotal attachment on a vehicle to freely depend, a drum rotatively mounted between said arms and having its axis inclined with the left end slightly forwards, a plurality of longitudinal dovetailed grooves on the periphery of said drum, blocks slidably mounted in said grooves and having projecting teeth for striking ice on the road to break same up, means for rotating said drum, and means for shifting said blocks laterally in their extreme bottom positions, said means for rotating the drum including a driven wheel connected with the drum.

6. A street ice remover, comprising a pair of spaced arms for pivotal attachment on a vehicle to freely depend, a drum rotatively mounted between said arms and having its axis inclined with the left end slightly forwards, a plurality of longitudinal dovetailed grooves on the periphery of said drum, blocks slidably mounted in said grooves and having projecting teeth for striking ice on the road to break same up, means for rotating said drum, and means for shifting said blocks laterally in their extreme bottom positions, comprising a cam supported from one of said arms and cooperative with cams upon the end blocks of said lines of blocks, and resilient means urging said blocks to engage the cams.

7. A street ice remover, comprising a pair of spaced arms for pivotal attachment on a vehicle to freely depend, a drum rotatively mounted between said arms and having its axis inclined with the left end slightly forwards, a plurality of longitudinal dovetailed grooves on the periphery of said drum, blocks slidably mounted in said grooves and having projecting teeth for striking ice on the road to break same up, means for rotating said drum, means for shifting said blocks laterally in their extreme bottom positions, and means for supporting said drum in various elevated positions.

8. A street ice remover, comprising a pair of spaced arms for pivotal attachment on a vehicle to freely depend, a drum rotatively mounted between said arms and having its axis inclined with the left end slightly forwards, a plurality of longitudinal dovetailed grooves on the periphery of said drum, blocks slidably mounted in said grooves and having projecting teeth for striking ice on the road to break same up, means for rotating said drum, means for shifting said blocks laterally in their extreme bottom positions, and means for supporting said drum in various elevated positions, including an arrangement whereby the drum is free to move upwards.

9. A street ice remover, comprising a pair of spaced arms for pivotal attachment on a vehicle to freely depend, a drum rotatively mounted between said arms and having its axis inclined with the left end slightly forwards, a plurality of longitudinal dovetailed grooves on the periphery of said drum, blocks slidably mounted in said grooves and having projecting teeth for striking ice on the road to break same up, means for rotating said drum, means for shifting said blocks laterally in their extreme bottom positions, and means for supporting said drum in various elevated positions, including an arrangement whereby the drum is free to move upwards, and characterized by pins engaging beneath arms supporting the drum, and means for adjusting said pins to various elevated positions.

10. A street ice remover, comprising a pair of spaced arms for pivotal attachment on a vehicle to freely depend, a drum rotatively mounted between said arms and having its axis inclined with the left end slightly forwards, a plurality of longitudinal dovetailed grooves on the periphery of said drum, blocks slidably mounted in said grooves and having projecting teeth for striking ice on the road to break same up, means for rotating said drum, means for shifting said blocks laterally in their extreme bottom positions, and a shield to catch flying chunks of ice mounted upon said vehicle directly behind said drum.

11. A street ice remover, comprising a pair of spaced arms for pivotal attachment on a vehicle to freely depend, a drum rotatively mounted between said arms and having its axis inclined with the left end slightly forwards, a plurality of longitudinal dovetailed grooves on the periphery of said drum, blocks slidably mounted in said grooves and having projecting teeth for striking ice on the road to break same up, means for rotating said drum, means for shifting said blocks laterally in their extreme bottom position, and a plow for the front of said vehicle.

12. A street ice remover, comprising a pair of spaced arms for pivotal attachment on a vehicle to freely depend, a drum rotatively mounted between said arms and having its axis inclined with the left end slightly forwards, a plurality of longitudinal dovetailed grooves on the periphery of said drum, blocks slidably mounted in said grooves and having projecting teeth for striking ice on the road to break same up, means for rotating said drum, means for shifting said blocks laterally in their extreme bottom position, and a raising apparatus for holding said drum in various elevated positions.

JOHN KERSTEN.